I. MANNING.
Feed-Wheel for Sewing-Machines.

No. 161,250. Patented March 23, 1875.

Witnesses.
Inventor.
Ira Manning.
By Atty A. B. Stoughton

UNITED STATES PATENT OFFICE.

IRA MANNING, OF PHILADELPHIA, PENNSYLVANIA.

IMPROVEMENT IN FEED-WHEELS FOR SEWING-MACHINES.

Specification forming part of Letters Patent No. 161,250, dated March 23, 1875; application filed February 11, 1875.

*To all whom it may concern:*

Be it known that I, IRA MANNING, of the city of Philadelphia and State of Pennsylvania, have invented certain new and useful Improvements in Feed-Wheels for Sewing-Machines; and I do hereby declare the following to be a full, clear, and exact description of the same, reference being had to the accompanying drawings, making a part of this specification, in which—

Figure 1:
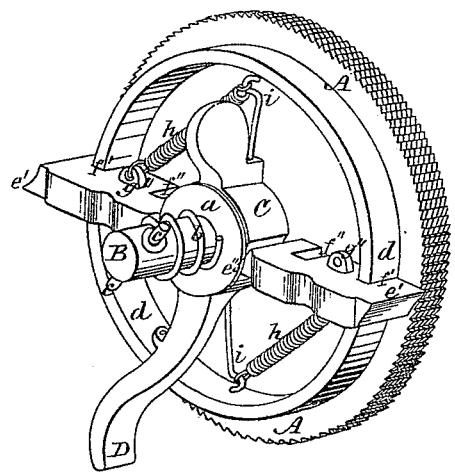
Figure 2:
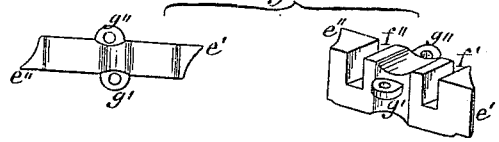
Figure 3:
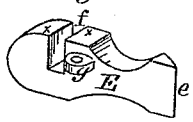

Figure 1 represents, in perspective, the feed-wheel with its appliances in working position. Fig. 2 represents a side and perspective view of my improved clutch-arm, detached from its working position in the feed-wheel, and Fig. 3 represents, in perspective, the hitherto used clutch-arm for feed-wheels.

In operating a feed-wheel by clutches or clutch-arms the opposite corners of the slot therein catch upon the flange of the feed-wheel and so turn the latter. This slot wears away and then fails to hold to or against the flange of the feed-wheel, and then a new clutch must be procured, and that is not always easy to do.

The object and purpose of my invention are to make these clutches or clutch-arms reversible or interchangeable, and furnished with two slots and two eyes for the retracting-spring, so that when one of the slots wears out the clutch can be shifted and a new slot brought into action, the spring being changed from one eye to the opposite one.

To enable others skilled in the art to make and use my invention, I will proceed to describe the same with reference to the drawings.

The feed-wheel is represented at A, and turns upon its hub or boss around the spindle B. Over the hub or boss of the feed-wheel is placed the hub C, to which is attached a lever, D, by which said hub C and its appliances are moved, and said hub and lever C D are held to the boss of the feed-wheel by a washer, $a$, spring $b$, and pin $c$, or their mechanical equivalents.

As heretofore constructed, the clutch-arms, that slip and bind upon the flange $d$ of the feed-wheel were made like that shown at E, Fig. 3, viz., with one bevel or chisel end, $e$, one slot, $f$, and one eye, $g$, the chisel or bevel end taking into a recess in the hub C, the slot $f$ taking in the flange $d$, and the spiral spring $h$, as in Fig. 1, hooking into the eye $g$, and its other end to an arm, $i$, set in the hub C.

In operating the feed-wheel by clutches like that, E, the opposite corners $x$ $x$ of the slot $f$ sustain all the frictional strain between the clutches and the rim $d$, and soon become worn, and have to be thrown out, while it is not always easy to replace these arms.

My invention here steps in to obviate this so often change of clutches. I make the clutch, as shown in Figs. 1 and 2, with two beveled or chisel-shaped ends, $e'$ $e''$, two slots, $f'$ $f''$, and two eyes, $g'$ $g''$, so that either of the ends $e'$ $e''$ will take into the recess in the hub C, either of the slots $f'$ $f''$ will take over the rim $d$, and the spring $h$ be attachable to either one of the eyes $g'$ $g''$, as the case may be, and, by reversing the clutches end for end, a new slot is brought into action after the former one is worn out. These clutches, of which there are two, are interchangeable, if it is desired to so change them; but simply reversing them will bring into action new and unworn frictional surfaces when the previous ones are worn out.

Having thus fully described my invention, what I claim therein as new is—

In combination with the feed-wheel A, the reversible or interchangeable clamp, having two bearing ends, $e'$ $e''$, two slots, $f'$ $f''$, and two eyes, $g'$ $g''$, as and for the purpose described and represented.

IRA MANNING.

Witnesses:
HENRY BURK,
HENRY F. HEYL.